United States Patent
Stribaek et al.

(10) Patent No.: US 7,181,484 B2
(45) Date of Patent: Feb. 20, 2007

(54) EXTENDED-PRECISION ACCUMULATION OF MULTIPLIER OUTPUT

(75) Inventors: Morten Stribaek, Fredriksberg (DK); Pascal Paillier, Paris (FR)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/788,685

(22) Filed: Feb. 21, 2001

(65) Prior Publication Data

US 2002/0116432 A1 Aug. 22, 2002

(51) Int. Cl.
*G06F 7/38* (2006.01)
*G06F 7/00* (2006.01)

(52) U.S. Cl. ........................ 708/523; 708/492
(58) Field of Classification Search ................. 708/523, 708/620, 625, 492
See application file for complete search history.

(56) References Cited

U.S. PATENT DOCUMENTS

| | | | |
|---|---|---|---|
| 3,654,621 A | 4/1972 | Bock et al. | |
| 3,916,388 A | 10/1975 | Shimp et al. | |
| 4,023,023 A | 5/1977 | Bourrez et al. | |
| 4,109,310 A | 8/1978 | England et al. | |
| 4,128,880 A | 12/1978 | Cray, Jr. | |
| 4,130,880 A | 12/1978 | Nutter | |
| 4,219,874 A | 8/1980 | Gusev et al. | |
| 4,317,170 A | 2/1982 | Wada et al. | |
| 4,396,982 A | 8/1983 | Wada et al. | |
| 4,491,910 A | 1/1985 | Caudel et al. | |
| 4,495,598 A | 1/1985 | Vahlstrom et al. | |
| 4,507,731 A | 3/1985 | Morrison | |
| 4,511,990 A | 4/1985 | Hagiwara et al. | |
| 4,520,439 A | 5/1985 | Liepa | |
| 4,538,239 A | 8/1985 | Magar | |
| 4,583,199 A | 4/1986 | Boothroyd et al. | |
| 4,773,006 A | 9/1988 | Kinoshita et al. | |
| 4,809,212 A * | 2/1989 | New et al. ................... | 708/625 |
| 4,814,976 A | 3/1989 | Hansen et al. | |
| 4,852,037 A | 7/1989 | Aoki | |
| 4,868,777 A | 9/1989 | Nishiyama et al. | |
| 4,879,676 A | 11/1989 | Hansen | |
| 4,891,781 A | 1/1990 | Omura | |
| 4,928,223 A | 5/1990 | Dao et al. | |
| 4,949,250 A | 8/1990 | Bhandarkar et al. | |
| 5,073,864 A | 12/1991 | Methvin et al. | |

(Continued)

FOREIGN PATENT DOCUMENTS

| | | |
|---|---|---|
| DE | 196 44 688 A1 | 4/1998 |
| EP | 0681236 B1 | 11/1995 |
| EP | 0681236 A1 | 11/1995 |
| WO | WO97/07450 | 2/1997 |
| WO | WO97/08608 | 3/1997 |

OTHER PUBLICATIONS

IBM Tech. Discl. Bull. "Pipelined Hardware Multipliyer with Extended Precision", vol. 23, Issue #9, pp. 4322–4323.*

(Continued)

*Primary Examiner*—Tan V. Mai
(74) *Attorney, Agent, or Firm*—Sterne, Kessler, Goldstein & Fox P.L.L.C.

(57) ABSTRACT

A multiply unit includes an extended precision accumulator. Microprocessor instructions are provided for manipulating portions of the extended precision accumulator including an instruction to move the contents of a portion of the extended accumulator to a general-purpose register ("MFLHXU") and an instruction to move the contents of a general-purpose register to a portion of the extended accumulator ("MTLHX").

48 Claims, 10 Drawing Sheets

U.S. PATENT DOCUMENTS

| | | |
|---|---|---|
| 5,150,290 A | 9/1992 | Hunt |
| 5,185,713 A | 2/1993 | Kobunaya |
| 5,280,439 A | 1/1994 | Quek et al. |
| 5,392,228 A | 2/1995 | Burgess et al. |
| 5,396,502 A | 3/1995 | Owsley et al. |
| 5,418,915 A | 5/1995 | Matuda et al. |
| 5,499,299 A | 3/1996 | Takenaka et al. |
| 5,513,366 A | 4/1996 | Agarwal et al. |
| 5,517,438 A | 5/1996 | Dao-Trong et al. |
| 5,537,562 A | 7/1996 | Gallup et al. |
| 5,550,768 A | 8/1996 | Ogilvie et al. |
| 5,581,773 A | 12/1996 | Glover |
| 5,590,345 A | 12/1996 | Barker et al. |
| 5,666,298 A | 9/1997 | Peleg et al. |
| 5,669,010 A | 9/1997 | Duluk, Jr. |
| 5,671,401 A | 9/1997 | Harrell |
| 5,673,407 A | 9/1997 | Poland et al. |
| 5,721,892 A | 2/1998 | Peleg et al. |
| 5,726,927 A | 3/1998 | Wolrich et al. |
| 5,729,724 A | 3/1998 | Sharangpani et al. |
| 5,734,600 A | 3/1998 | Dieffenderfer et al. |
| 5,734,874 A | 3/1998 | Van Hook et al. |
| 5,740,340 A | 4/1998 | Purcell et al. |
| 5,748,979 A | 5/1998 | Trimberger |
| 5,752,071 A | 5/1998 | Tubbs et al. |
| 5,758,176 A | 5/1998 | Agarwal et al. |
| 5,761,523 A | 6/1998 | Wilkinson et al. |
| 5,774,709 A | 6/1998 | Worrell |
| 5,778,241 A | 7/1998 | Bindloss et al. |
| 5,781,457 A | 7/1998 | Cohen et al. |
| 5,784,602 A | 7/1998 | Glass et al. |
| 5,790,827 A | 8/1998 | Leung |
| 5,793,661 A | 8/1998 | Dulong et al. |
| 5,809,294 A | 9/1998 | Ando |
| 5,812,147 A | 9/1998 | Van Hook et al. |
| 5,812,723 A | 9/1998 | Ohtsu et al. |
| 5,815,695 A | 9/1998 | James et al. |
| 5,815,723 A | 9/1998 | Wilkinson et al. |
| 5,822,606 A | 10/1998 | Morton |
| 5,838,984 A | 11/1998 | Nguyen et al. |
| 5,848,269 A | 12/1998 | Hara |
| 5,852,726 A | 12/1998 | Lin et al. |
| 5,864,703 A | 1/1999 | van Hook et al. |
| 5,867,682 A | 2/1999 | Witt et al. |
| 5,880,984 A | 3/1999 | Burchfiel et al. |
| 5,881,307 A | 3/1999 | Park et al. |
| 5,887,183 A | 3/1999 | Agarwal et al. |
| 5,922,066 A | 7/1999 | Cho et al. |
| 5,933,650 A | 8/1999 | van Hook et al. |
| 5,936,872 A | 8/1999 | Fischer et al. |
| 5,944,776 A | 8/1999 | Zhang et al. |
| 5,953,241 A | 9/1999 | Hansen et al. |
| 5,960,012 A | 9/1999 | Spracklen |
| 5,996,056 A | 11/1999 | Volkonsky |
| 6,006,316 A | 12/1999 | Dinkjian |
| 6,009,450 A | 12/1999 | Dworkin et al. |
| 6,026,420 A | 2/2000 | DesJardins et al. |
| 6,035,316 A | 3/2000 | Peleg et al. |
| 6,035,317 A | 3/2000 | Guy |
| 6,058,465 A | 5/2000 | Nguyen |
| 6,065,115 A | 5/2000 | Sharangpani et al. |
| 6,067,615 A | 5/2000 | Upton |
| 6,073,154 A | 6/2000 | Dick |
| 6,078,941 A | 6/2000 | Jiang et al. |
| 6,088,783 A | 7/2000 | Morton |
| 6,128,726 A | 10/2000 | LeComec |
| 6,138,229 A | 10/2000 | Kucukcakar et al. |
| 6,141,421 A | 10/2000 | Takaragi et al. |
| 6,154,834 A | 11/2000 | Neal et al. |
| 6,199,087 B1 | 3/2001 | Blake et al. |
| 6,199,088 B1 | 3/2001 | Weng et al. |
| 6,233,597 B1 * | 5/2001 | Tanoue et al. ............... 708/625 |
| 6,266,758 B1 | 7/2001 | van Hook et al. |
| 6,279,023 B1 | 8/2001 | Weng et al. |
| 6,295,599 B1 | 9/2001 | Hansen et al. |
| 6,298,438 B1 | 10/2001 | Thayer et al. |
| 6,349,318 B1 * | 2/2002 | Vanstone et al. ........... 708/492 |
| 6,513,054 B1 | 1/2003 | Carroll |
| 6,523,054 B1 | 2/2003 | Kamijo |
| 6,651,160 B1 | 11/2003 | Hays |
| 6,711,602 B1 | 3/2004 | Bhandal et al. |
| 6,760,742 B1 | 7/2004 | Hoyle |
| 2002/0062436 A1 | 5/2002 | Van Hook et al. |
| 2003/0172254 A1 | 9/2003 | Mandavilli et al. |

OTHER PUBLICATIONS

Jae Wook Chung et al., *Fast Implementation of Elliptic Curve Defined over $GF(p^m)$ on CalmRISC with MAC2424 Coprocessor*, C.K. Koc and C. Paar (Eds.): CHES 2000, LNCS 1965, pp. 57–70, 2000.

Darrel Hankerson et al., *Software Implementation of Elliptic Curve Cryptography over Binary Fields*, C.K. Koc and C. Paar (Eds.): CHES 2000, LNCS 1965, pp. 1–24, 2000.

Marc Joye et al., *Efficient Generation of Prime Numbers*, C.K. Koc and C. Paar (Eds.): CHES 2000, LNCS 1965, pp. 340–354, 2000.

Souichi Okada et al., *Implementation of Elliptic Curve Crytographic Coprocessor over $GF(2^m)$ on an FPGA*, C.K. Koc and C. Paar (Eds.): CHES 2000, LNCS 1965, pp. 25–40, 2000.

Geraldo Orlando et al., *A High–Performance Reconfigurable Elliptic Curve Processor for $GF(2^m)$* *, C.K. Koc and C. Paar (Eds.): CHES 2000, LNCS 1965, pp. 41–56, 2000.

Erkay Savas et al., *A Scalable and Unified Multiplier Architecture for Finite Fields $GF(p)$ and $GF(2^m)$* *, C.K. Koc and C. Paar (Eds.): CHES 2000, LNCS 1965, pp. 277–292, 2000.

Zhijie Shie et al., *Bit Permutation Instructions for Accelerating Software Cryptography*, Proceedings of the IEEE International Conference on Application–specific Systems, Architectures and Processors, Jul. 10–12, 2000, Boston, Massachusetts, USA, pp. 138–148.

Bier, J., "DSP16xxxTargets Communications Apps," *Microprocessor Report*, MicroDesign Resources, Sept. 15, 1997, pp. 11–15.

Case, Brian, "Superscalar Techniques: SuperSPARC vs. 88110," *Microprocessor Report*, vol. 5, No. 22, Dec. 4, 1991, pp. 1 and 6–1 1.

Diefendorff, K., "*The 88100: A Superscalar Microprocessor with Graphics Support* " (Motorola), Microprocessor Forum, Nov. 1991, 20 pages (Bates Nos. L00622–00641).

Diefendorff, K. and Allen, M., "*Organization of the Motorola 88110: A Superscalar RISC Microprocessor*," Motorola Inc., date unknown, 12 pages (Bates Nos. L00642–00653).

El–Sharkawy, Mohamed, Ph.D., *Digital Signal Processing Applications with Motorola's DSP56002 Processor*, Prentice Hall PTR, 1996, pp. 43–124 (Bates Nos. L06519–L06601).

Eyre, Jennifer and Bier, Jeff, "Infineon's TriCore Tackles DSP," *Microprocessor Report*, Apr. 19, 1999, pp. 12–14.

Feigel, Curtis P., "TI Introduces Four–Processor DSP Chip," *Microprocessor Report*, Mar. 28, 1994, pp. 22–25.

Gwennap, L., "Digital, MIPS Add Multimedia Extensions," *Microprocessor Report*, MicroDesign Resources, vol. 10, No. 15, Nov. 18, 1996, pp. 1–5.

Gwennap, L., "Intel's MMX Speeds Multimedia," *Microprocessor Report*, MicroDesign Resources, vol. 10, No. 3, Mar. 5, 1996, pp. 1–6.

Gwennap, L., "New Multimedia Chips to Enter the Fray," *Microprocessor Report*, MicroDesign Resources, vol. 10, No. 13, Oct. 1996, 1 page.

Gwennap, L., "UltraSparc Adds Multimedia Instructions," *Microprocessor Report*, MicroDesign Resources, vol. 8, No. 16, Dec. 5, 1994, pp. 1–3.

Halfhill, Tom R. and Belgard, Rich, "Mips vs. Lexra: Definitely Not Aligned," *Microprocessor Report*, vol. 13, No. 16, Dec. 6, 1999, pp. 1–5.

Hansen, Craig, "Architecture of a Broadband Mediaprocessor," COMPCON96, Feb. 25–29, 1996, 8 pages.

Hays, Pat, *LX5280 High–Performance RISC–DSP for IP Licensing*, at http://www.lexra.com/presentation/, 27 pages (Jun 8, 1999).

Heinrich, J., *MIPS R4000 Microprocessor User's Manual*, Second Edition, MIPS Technologies, Inc., 1994, pp. 154–155, 157, 159, 161, 168, 170–171, B–9, B–10, B–13, B–17, B–19, B–21, B–23, B–27, B–38, B–40, and B–62.

Killian, E., "MIPS Extensions for Digital Media," Microprocessor Forum, Oct. 22–23, 1996, pp. 1–5.

Lee, Ruby, "Accelerating Multimedia with Enhanced Microprocessors," *IEEE, Micro*, IEEE, Apr., 1995, pp. 22–23 (Bates Nos. L08566–L08576).

Peleg, A. and Weiser, U., "MMX Technology Extension To The Intel Architecture," *IEEE Micro*, IEEE, Aug. 1996, pp. 42–50 (Bates Nos. L07222–L07230).

Turley, J., "Siemens TriCore Revives CISC Techniques," *Microprocessor Report*, MicroDesign Resources, Nov. 17, 1997, pp. 13–16.

Turley, Jim and Hakkarainen, Harri, "TI's New 'C6x DSP Screams at 1,600 MIPS," *Microprocessor Report*, Feb. 17, 1997, pp. 14–17.

Weiss, R., *ARM Piccolo Mixes ARM RISC with DSP*, at http://ww.estd.com/Editorial/1996/11/Briefs/arm.html, 1 page (Nov. 1996).

Yarlagadda, Krishna, "Lexra Adds DSP Extensions," *Microprocessor Report*, Aug. 23, 1999, pp. 19–21 (printed from West database, 6 pages).

*601 First Silicon*, at http://www.mot.com/SPS/PowerPC/library/press_releases/601_First_Silicon. html, 2 pages (Oct. 1, 1992).

88410 Second Level Cache, *Microprocessor Forum*, Motorola Inc., Nov. 1991, 20 pages (Bates Nos. L00622–L00641).

*A236 Parallel Digital Signal Processor Chip Programmer's Reference Manual*, Oxford Micro Devices, Inc., 1994, 195 pages (Bates Nos. L11184–L11378).

*AN1214: MC881 10 64–bit External Bus Interface to 16–bit EPROM*, at http://www.mot–sps.com/lit/html/anl214.html, 1 page (Jan. 24, 1997).

*DSP56000 24–Bit Digital Signal Processor Family Manual*, Motorola, Inc., 1995, 638 pages (Bates Nos. L08722–L09359).

*DSP56002 24–Bit Digital Signal Processor User's Manual*, Motorola, Inc., 1995, 386 pages (Bates Nos. L07277–L07662).

*DSP56002/DSP56L002 Motorola Semiconductor Product Information*, Motorola, Inc. 1994, 3 pages (Bates Nos. L07913–L07915).

DSP56002 *Semiconductor Technical Data*, Motorola, Inc., 1996, 110 pages (Bates Nos. L07803–L07912).

*EB162: Programming Tips (MC88110)*, at http://www.mot–sps.com/lit/html/eb162.html, 1 page (Jan. 24, 1997).

Hardware Implications of xmem as a st followed by a ld, *Motorola Semiconductor Engineering Bulletin*, Motorola, Sep. 1992, 5 pages.

*i860™ Microprocessor Family Programmer's Reference Manual*, Intel Corporation, 1992, 79 pages (Bates Nos. L0936 1–L09439).

*IEEE Standard for Binary Floating–Point Arithmetic*, IEEE, 1985, pp. i–vi and 1–14.

Interrupt Latency in the MC8110, *Motorola Semiconductor Engineering Bulletin*, Motorola, 1992, pp. 1,2 and 4–9.

*An Introduction to Thumb™*, Version 2.0, Advanced RISC Machines, Mar. 1995, 29 pages.

*Lexra Announces Industry's First RISC–DSP Core Based on MIPS® Instruction Set Architecture*, at http://www.lexra.com/pr_990505.html, 3 pages (May 5, 1999).

*Lexra Announces the Fastest 32–BIT RISC Core to Execute MIPS® Instructions\**, at http://www.lexra. com/pr_990719.html, 2 pages (Jul. 19, 1999).

*Lexra Announces the First Mainstream 32–bit RISC Core In a Programmable Logic Device*, at http://www. lexra.com/pr_981005.html, 3 pages (Oct. 5, 1998).

*Lexra Announces its LX4080 Evaluation System is Proven and Available for Production*, at http://www. lexra.com/pr_980720.html, 2 pages (Jul. 20, 1998).

*Lexra Announces LX4080 Embedded RISC Processor Core, Delivery High Performance & executes MIPS–I instructions set\**, at http://www.lexra.com/pr_980112.html, 2 pages (Jan. 12, 1998).

*Lexra Announces LX4080 SmoothCore™ Silicon Proven RISC Core*, at http://www.lexra.com/pr_980323.html, 3 pages (Mar. 23, 1998).

*Lexra Announces Next Generation Embedded RISC Core*, at http://www.lexra.com/pr_990111.html, 3 pages, (Jan. 11, 1999).

*Lexra ASYM–LX Instruction Set Simulator Product Brief*, date unknown, 2 pages.

*Lexra ASYM–LX Simulator/FIR Filter Demo*, date unknown, 5 pages.

*Lexra Command Line User Environment (CLUE) for ASYM–LX User's Guide*, Revision 1.1, Jan. 28, 2000, pp. 1–32.

*Lexra LX5280 Seminar Slides*, date unknown, 49 pages.

*Lexra [Products]*, at http://www.lexra.com/lx_products2.html, 2 pages (Copyright 1998–1999).

Lexra Rolls Out Second MIPS Core (Lexra LX4180) (Product Announcement), *Microprocessor Report*, Jan. 28, 1999, 2 pages (printed from West database).

*LX4080*, at http://www.lexra.com/lx4080.html, 8 pages (Copyright 1998–1999).

*LX4080P*, at http://www.lexra.com/lx4080P.html, 6 pages (Copyright 1998–1999).

*LX4180*, at http://www.lexra.com/lx4180.html, 9 pages (Copyright 1998–1999).

*LX4280*, at http://www. lexra.com/lx4280.html, 2 pages (Copyright 1998–1999).

*LX4280* Fills Lexra's Midrange (MIPS–compatible embedded processor core) (Product Announcement), *Microprocessor Report,* Aug. 2, 1999, 2 pages (printed from West database).

*LX5280,* at http://www. lexra.com/lx5280.html, 2 pages (Copyright 1998–1999).

*MC88110/410DH/AD: MC88410/MC88410 Designer's Handbook,* at http://www.mot–sps.com/lit/html/mc88110410dhad.html, 1 page (Jan. 24, 1997).

*MC88110UM/AD: MC88110 Second Generation RISC Microprocessor User's Manual,* at http://www.mot sps.com/lit/html/mc88110umad.html, 1 page (Jan. 24, 1997).

*MC88410UM/AD: MC88410 Secondary Cache Controller User's Manual,* at http://www.mot sps.com/lit/html/mc88410umad.html, 1 page (Jan. 24, 1997).

*Microprocessor Devices Reliability Monitor Report: Thrid Quarter 1997,* Motorola, 8 pages (1997).

*Microprocessor Devices Reliability Monitor Report: Fourth Quarter 1997,* Motorola, 10 pages (1997).

*MIPS Technologies, Inc. Files Lawsuit to Protect Intellectual Property Rights,* at http://www.mips.com/pressReleases/102899B.html, 2 pages (Oct. 28, 1999).

*MIPS Technologies, Inc. Litigation Overview and Q&A,* at http://www.mips.com/pressReleases/102899D.html, 3 pages (visited Feb. 24, 2000).

*MIPS: Open Letter from John Bourgoin, CEO, MIPS Technologies,* at http://www.mips.com/pressReleases/102899C.html, 2 pages (visited Feb. 24, 2000).

*Piccolo—The ARM Signal Processing Architecture,* at http://www.calab.cs.pusan.ac.kr/TechnicalReport . . . , 12 pages (visited Mar. 6, 2001).

*QML–DSP/MCM and Die Courier,* at http://www.ti.com/sc/docs/military/liter/ecour/dsp.htp, 7 pages (Jan 1996).

*Reliability Monitor Environmental Stress Data 3Q97,* Motorola, 1997, 4 pages.

*Reliability and Quality Report 3Q97,* Motorola, 1997, 2 pages.

*Reliability and Quality Report 4Q97,* Motorola, 1997, 2 pages.

Running the MC88110 in *Lockstep,Motorola Semiconductor Engineering Bulletin,* Motorola, 1992, 2 pages.

*TMS320C1x/C2x/C2xx/C5x Assembly Language Tools User's Guide,* Texas Instruments, Mar. 1995,483 pages (Bates Nos. L07916–L08398).

*TMS320C5x General–Purpose Applications User's Guide,* Texas Instruments, Jul. 1997, 167 pages (Bates Nos. L08399–L08565).

*TMS32010 User's Guide,* Texas Instruments Incorporated, 1983, p. 1183.

*TMS320C80 Digital Signal Processor,* Texas Instruments, Jul. 1984, p. 41.

*VIS ™ Instruction Set User's Manual,* Sun Microsystems, Inc., pp. i–xii and 1–136, at http://www.nondot.org/sabre/os/files/processors/VISInstructionSetUsersManual.pdf (1997).

Drescher, W. and Fettweis, G., "VLSI Architectures for Multiplication in GF ($2^m$) for Application Tailored Digital Signal Processors," in VLSI Signal Processing, IX, San Francisco, Ca., USA (Oct. 30–Nov. 1, 1996), IEEE, Piscataway, New Jersey, USA, pp. 55–64.

Drescher, W. et al., "VLSI Architecture for Datapath Integration of Arithmetic Over GF($2^m$) on Digital Signal Processors," in IEEE International Conference on Acoustics, Speech, and Signal Processing, Munich, Germany (Apr. 21–24, 1997), IEEE, Los Alamitos, Ca., USA, pp. 631–634.

Texas Instrument Application Report, "The MSP430 Hardware Multiplier, Functions and Application," [online] Apr. 1999, [Retrieved on Feb. 16, 2006] Retrieved from the Internet: <URL: http://focus.ti.com/lit/an/slaa042/sla042.pdf> (34 pages).

Copy of European Search Report from European Appl. No. EP 02 71 7430, dated Feb. 16, 2006, 3 pages.

Lijun Gao, Sarvesh Shrivastava, Hanbo Lee, Gerald E. Sobelman, "A Compact Fast Variable Key Size Elliptic Curve Cryptosystem Coprocessor, " Proceedings of the $7^{th}$ Annual IEEE Symposium on Field–Programmable Custom Computing Machines, Apr. 21–23, 1999, pp. 304–305 (4 pages).

\* cited by examiner

| Special 000000 | 0 0000000000 | rd | MFLHXU 00001 | MFLO/MFLHXU 010010 |
|---|---|---|---|---|
| 6 | 10 | 5 | 5 | 6 |

| Special 000000 | rs | MTLHX 000000000000001 | MTLO/MTLHX 010011 |
|---|---|---|---|
| 6 | 5 | 15 | 6 |

EXTENDED-PRECISION ACCUMULATION OF MULTIPLIER OUTPUT

CROSS-REFERENCE TO RELATED APPLICATIONS

This application is related to the following co-pending applications, each of which is being filed concurrently with this application and is incorporated by reference: (1) U.S. application Ser. No. 09/788,683, titled "Partial Bitwise Permutations"; (2) U.S. application Ser. No. 09/788,670 titled "Binary Polynomial Multiplier"; (3) U.S. application Ser. No. 09/788,684, titled "Polynomial Arithmetic Operations"; and (4) U.S. application Ser. No. 09/788,682, titled "Configurable Instruction Sequence Generation".

TECHNICAL FIELD

This invention relates to a microprocessor multiplier, and more particularly to a microcomputer multiplier with an extended precision accumulator.

BACKGROUND

Reduced instruction set computer (RISC) architectures were developed as industry trends tended towards larger, more complex instruction sets. By simplifying instruction set designs, RISC architectures make it easier to use techniques such as pipelining and caching, thus increasing system performance.

RISC architectures usually have fixed-length instructions (e.g., 16-bit, 32-bit, or 64-bit), with few variations in instruction format. Each instruction in an instruction set architecture (ISA) may have the source registers always in the same location. For example, a 32-bit ISA may always have source registers specified by bits 16–20 and 21–25. This allows the specified registers to be fetched for every instruction without requiring any complex instruction decoding.

SUMMARY

Cryptographic systems ("cryptosystems") are increasingly used to secure transactions, to encrypt communications, to authenticate users, and to protect information. Many private-key cryptosystems, such as the Digital Encryption Standard (DES), are relatively simple computationally and frequently reducible to hardware solutions performing sequences of XORs, rotations, and permutations on blocks of data. Public-key cryptosystems, on the other hand, may be mathematically more subtle and computationally more difficult than private-key systems.

While different public-key cryptography schemes have different bases in mathematics, they tend to have a common need for integer computation across very large ranges of values, on the order of 1024 bits. This extended precision arithmetic is often modular (i.e., operations are performed modulo a value range), and in some cases polynomial instead of twos-complement. For example, RSA public-key cryptosystems use extended-precision modular exponentiation to encrypt and decrypt information and elliptic curve cryptosystems use extended-precision modular polynomial multiplication.

Public-key cryptosystems have been used extensively for user authentication and secure key exchange, while private-key cryptography has been used extensively to encrypt communication channels. As the use of public-key cryptosystems increases, it becomes desirable to increase the performance of extended-precision modular arithmetic calculations.

In one general aspect, a multiply unit is provided for use in a microprocessor having at least one general-purpose register for storing a predetermined number of bits. The multiply unit includes a multiplier and an extended-precision accumulator including more bits than each of the general-purpose registers.

Implementations include using the multiplier to provide a multiply-add operation whereby operands to the multiply unit are multiplied and added to the contents of the extended-precision accumulator. The multiplier may include an arithmetic multiplier and a polynomial multiplier.

In a polynomial multiplier implementation, a multiply-add operation multiplies two operands and adds the result to the contents of the extended-precision accumulator using an exclusive-or operation. In some implementations, the multiplier includes result logic for selecting which values to load into the extended-precision accumulator. For example, the result logic may be implemented as a multiplexer.

In some implementations, the extended-precision accumulator includes an extended register, a high-order register, and a low-order register. For example, the extended register may store 8-bit values and the other two registers may store 32-bit values. Instructions are provided for manipulating the contents of the extended-precision accumulator. One instruction moves a value from the extended-precision accumulator into a general-purpose register and an inverse instruction moves a value from a general-purpose register into the extended-precision accumulator. The instructions additionally may shift the contents of the extended-precision register.

The details of one or more implementations are set forth in the accompanying drawings and the description below. Other features and advantages will be apparent from the description and drawings, and from the claims.

DESCRIPTION OF DRAWINGS

FIGS. 10A and 10B are instruction encodings for exemplary instructions manipulating an extended-precision multiplier.

DETAILED DESCRIPTION

Many public-key cryptosystems use extended-precision modular arithmetic to encrypt and decrypt data. For example, many elliptic curve (EC) cryptosystems extensively use polynomial multiplication and addition to encrypt and decrypt data. Performance of elliptic curve cryptosystems may be enhanced by modifying a programmable CPU multiplier to be responsive to newly defined instructions dedicated to polynomial operations.

When using elliptic curves defined over $GF(2^{163})$ (as recommended by the IEEE 1363-2000 standard), the main operation needed is multiplication over the field $GF(2^{163})$. Each of the $2^{163}$ elements can be represented as a polynomial of degree at most 163 with coefficients equal to 0 or 1. In this representation, two elements may be added using a simple bitwise XOR and two polynomials, a(X) and b(X), may be multiplied by computing a(X)b(X) mod P(X), where the product a(X)b(X) is a 326-degree polynomial, and P(X) is an irreducible polynomial as specified by the IEEE 1363-2000 standard.

Polynomial multiplication has the same form as modular multiplication, ab mod p, over the integers, except that: (1) regular addition is replaced by an XOR; and (2) regular 32-bit multiplication is replaced by a 32-bit carry-free multiplication. Therefore, polynomial modular multiplication may be performed using shifts and XORs instead of shifts and adds.

It is desirable to provide a multiply unit that supports fast polynomial multiplication and various other operations to increase the performance of cryptographic and other systems.

Providing support for extended precision modular arithmetic and polynomial operations can increase the performance of cryptosystems. Some cryptographic systems, such as those performing RSA cryptographic signature authentication, perform successive extended precision modular multiplications, accumulating the sum of the results. The performance of these systems may be increased by providing support in a multiply unit for an instruction to multiply two operands and add the result to an accumulator. When successive multiply/adds are performed, the accumulator may overflow. It is desirable to provide an extended precision accumulator to provide increased performance in cryptosystems and other systems.

Figure 1:
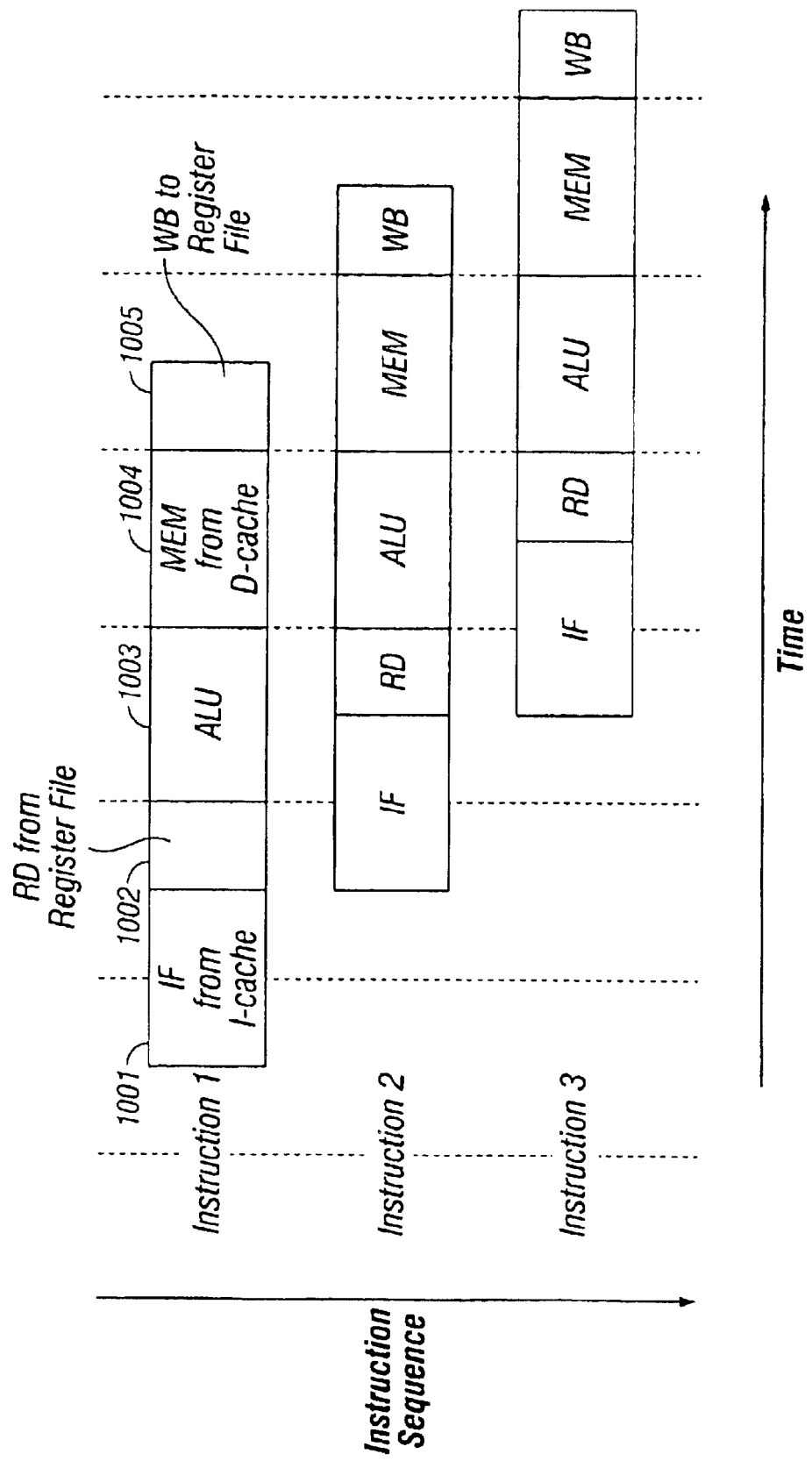
FIG. 1 is a block diagram of an exemplary five-stage pipeline that may be used in a RISC architecture.

Referring to FIG. 1, an exemplary microprocessor architecture that may be used to implement polynomial multiplication includes a five-stage pipeline in which an instruction may be issued each clock cycle and executed in a fixed amount of time, such as, for example, four clock cycles. The execution of each instruction is divided into five stages: instruction fetch (IF) stage 1001, register read (RD) stage 1002, arithmetic/logic unit (ALU) stage 1003, memory (MEM) stage 1004, and write back (WB) stage 1005. In the IF stage 1001, a specified instruction is fetched from an instruction cache. A portion of the fetched instruction is used to specify source registers that may be used in executing the instruction. In the read registers (RD) stage 1002, the system fetches the contents of the specified source registers. These fetched values may be used to perform arithmetic or logical operations in the ALU stage 1003. In the MEM stage 1004, an executing instruction may read/write memory in a data cache. Finally, in the WB stage 1005, values obtained by the execution of the instruction may be written back to a register.

Because some operations, such as floating point calculations and integer multiply/divide, cannot always be performed in a single clock cycle, some instructions merely begin execution of an instruction. After sufficient clock cycles have passed, another instruction may be used to retrieve a result. For example, when an integer multiply instruction takes five clock cycles, one instruction may initiate the multiplication calculation, and another instruction may load the results of the multiplication into a register after the multiplication has completed. If a multiplication has not completed by the time a result is requested, the pipeline may stall until the result is available.

Figure 2:
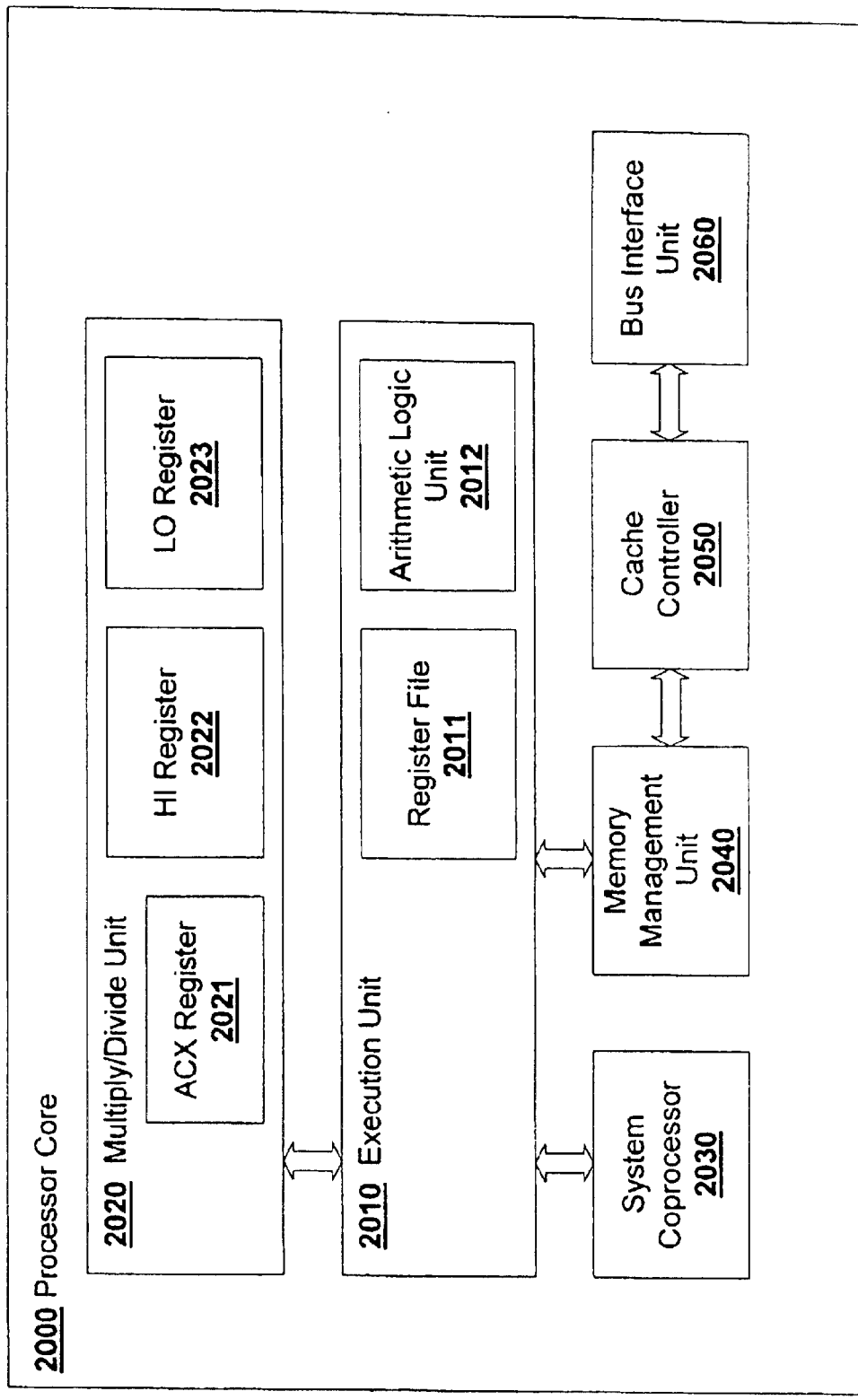
FIG. 2 is a block diagram of a processor core including an execution unit and a multiply unit.

Referring to FIG. 2, an exemplary RISC architecture is provided by way of example. The processor core 2000 (also referred to as a "microprocessor core") includes the following: an execution unit 2010, a multiply/divide unit (MDU) 2020, a system control coprocessor (CP0) 2030, a memory management unit 2040, a cache controller 2050, and a bus interface unit (BIU) 2060.

Execution unit 2010 is the primary mechanism for executing instructions within processor core 2000. Execution unit 2010 includes a register file 2011 and an arithmetic logic unit (ALU) 2012. In one implementation, the register file 2011 includes 32 32-bit general-purpose registers that may be used, for example, in scalar integer operations and address calculations. The register file 2011, which includes two read ports and one write port, may be fully bypassed to minimize operation latency in the pipeline. ALU 2012 supports both logical and arithmetic operations, such as addition, subtraction, and shifting.

The MDU 2020 may be used to perform various operations including some or all of the following instructions described below: DIV, DIVU, MADD, MADDU, MFHI, MFLO, MSUB, MSUBU, MTHI, MTLO, MUL, MULT, MULTU, MFLHXU, MTLHX, MADDP, MULTP, and PPERM.

In one implementation, LO register 2023 and HI register 2022 are each 32 bits wide and function as dedicated output registers of MDU 2020. In one implementation, ACX register 2021 provides 8 bits of additional integer precision beyond those provided by the HI/LO register pair. The precise number of bits is implementation dependent, with the preferred minimum size being 8 bits. For processors with 32-bit data paths, the preferred maximum size of the ACX register is 32 bits. In contrast, for processors with 64-bit data paths, the preferred maximum size of the ACX register is 64 bits. Hence, in a processor with 32-bit wide HI and LO registers, the combination of registers ACX/HI/LO can hold a concatenated value having more than 64 bits.

Figure 3:
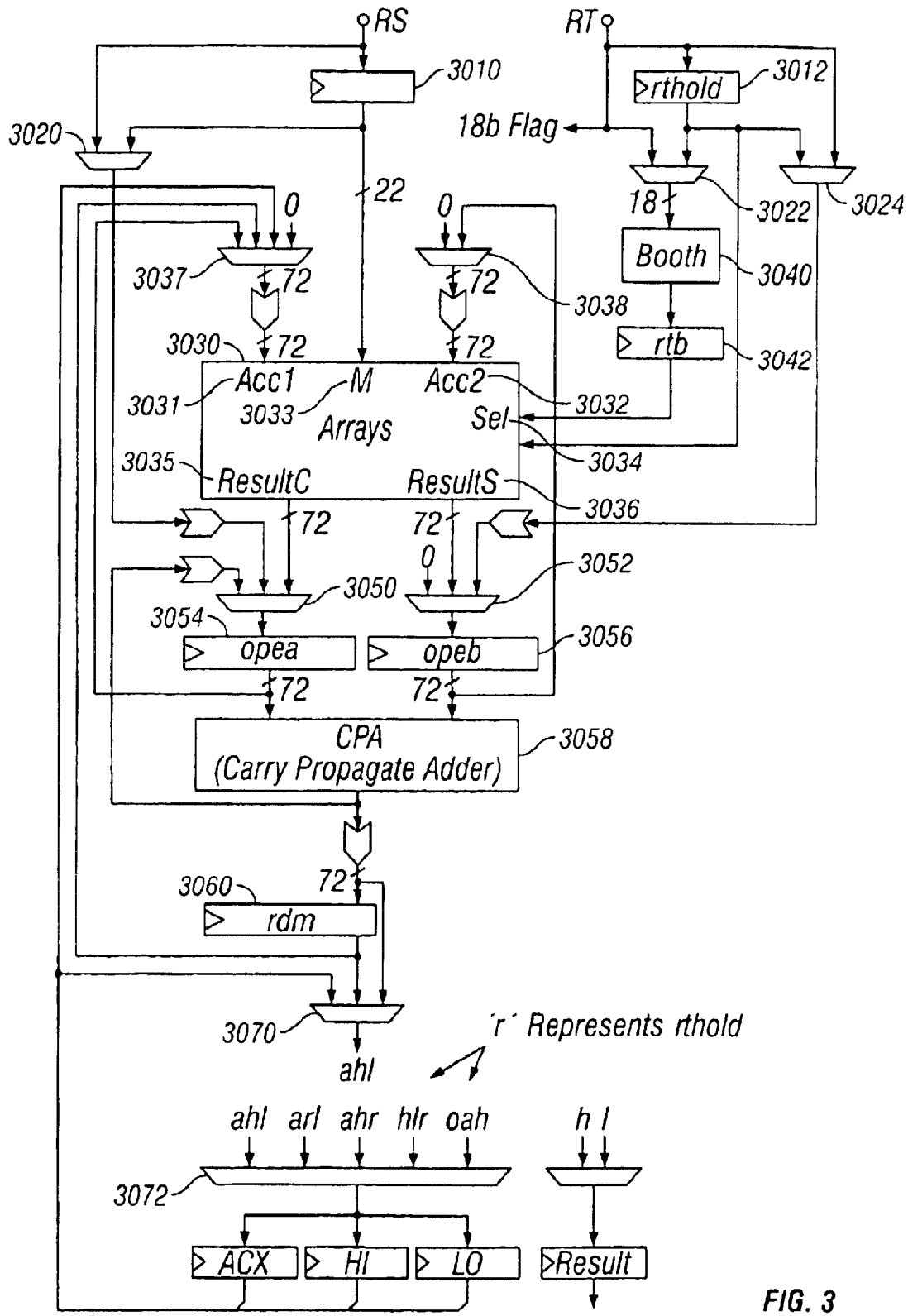
FIG. 3 is a diagram of data paths in an implementation of a multiply unit supporting binary polynomial arithmetic.

In the implementation described in FIGS. 2 and 3, the MDU 2020 includes a divide unit. However, other implementations provide a separate multiply and divide units implementing an extended accumulator in either the multiply unit, the divide unit, or in both the multiply and divide units.

The instructions MUL, MULT, and MULTU may be used to multiply two 32-bit numbers together. The result is stored in a specified register for MUL, and in the HI/LO registers for MULT and MULTU. For example, "MUL $7, $6, $5" multiplies the contents of registers $6 and $5 together and stores the result in register $7. The instruction "MULT $6, $5" multiplies the contents of registers $6 and $5 together and stores the result in the HI/LO registers. The MULTU instruction performs the same operation as MULT with MULTU applying to unsigned operands and MULT applying to signed operands. Additionally, the MULTU instruction clears the ACX register to all zeros.

The instructions DIV and DIVU perform division operations and store the results in the ACX/HI/LO registers. For example, "DIV $6, $5" divides the contents of register $6 by the contents of register $5 and stores the result in the ACX/HI/LO registers. The DIVU instruction performs the same operation on unsigned operands.

The instructions MSUB, MSUBU, MADD, and MADDU may be used to multiply the contents of two registers and then add or subtract the contents of the ACX/HI/LO registers. For example, "MSUB $6, $5" multiplies the contents of registers $6 and $5 together, subtracts the contents of the ACX/HI/LO registers from the result, and then stores the value in the ACX/HI/LO registers. The MADD instruction similarly multiplies the contents of two registers, adds the result to the ACX/HI/LO registers, and stores the result in the ACX/HI/LO registers. The MSUBU and MADDU perform the same operations on unsigned operands. In some implementations, the ACX register is not used in some operations and the contents of the ACX register following such operations may be undefined.

The MFHI, MFLO, MTHI, MTLO, MFLHXU, and MTLHX instructions are used to move data between the ACX/HI/LO registers and general-purpose registers. The first instruction, MFHI, loads the contents of the HI register into a general-purpose register. For example, "MFHI $5" loads the contents of the HI register into register $5. Similarly, MFLO loads the contents of the LO register into a general-purpose register. Conversely, the instructions MTHI and MTLO are used to load the contents of a general-purpose register into the HI or LO registers. For example, "MTHI $5" loads the contents of register $5 into the HI register.

More generally, an instruction format for MFLHXU ("Move From Extended Carry, Hi and Lo (Unsigned)") is shown in FIG. 10A. When executed, the value in LO register 2023 is written into the general-purpose register "rd" specified by the instruction, as shown in FIG. 10A. The value in HI register 2022 is then written to LO register 2023, the bits in ACX register 2021 are zero-extended and copied to HI register 2022, and the ACX register bits are cleared. The number of ACX register bits is implementation dependent, and may range, for example, from 0 to 64 bits. If no ACX register bits are implemented in a particular implementation, the value of the ACX register will be taken to be zero.

Similarly, the instruction format for MTLHX ("Move to Lo, Hi and Extended Carry") is shown in FIG. 10B. When executed, an appropriate number of bits (e.g., eight) of the value in HI register 2022 are written into the ACX register 2021. The value in LO register 2023 is then written to the HI register, and the value in general-purpose register "rs" (specified by the instruction, as shown in FIG. 10B) is written to the LO register. This is the reverse of the operation of the MFLHXU instruction. Again, the number of ACX register bits is implementation dependent, and may range, for example, from 0 to 64 bits. If HI register 2022 contains more significant bits than the number implemented in ACX register 2021, that information is discarded without raising an exception. If no ACX register bits are implemented, the move from the HI register to ACX register is taken as a "no-op".

In one implementation, the content of the ACX register is not directly accessible. For purposes of discussion, in this implementation the ACX register is 8 bits wide, and the HI and LO registers are each 32 bits wide. To indirectly access the ACX register, the values stored in the ACX/HI/LO registers may be shifted to the left or right. For example, "MFLHXU $5" shifts contents of the ACX, HI, and LO registers to the right by one register position, loading the contents of the LO register into register $5. Thus, after performing the operation, the ACX register is zero, the HI register contains the previous contents of the ACX register, the LO register contains the previous contents of the HI register, and the $5 register contains the previous contents of the LO register. Because the contents of the 8-bit ACX register are loaded into a 32-bit register, the 8-bit value may be zero-extended to 32-bits before loading the HI register.

The MTLHX performs the inverse operation. For example, "MTLHX $5" loads the ACX register with the previous contents of the HI register, loads the HI register with the previous contents of the LO register, and loads the LO register with the contents of the $5 register.

The PPERM operation performs permutations as specified in a register, and stores the result in the ACX/HI/LO registers. For example, "PPERM $5, $6" causes the ACX/HI/LO registers to be shifted 6-bits to the left. Then, low-order six bits are selected from register $5 as specified by register $6. The 32-bit contents of register $6 are used to select which bits of register $5 will be used to fill the low-order bits of the ACX/HI/LO registers. Since there are 32 bits in register $5, 5 bits are needed to specify a specific one of the 32 bits. For example, "01101" is binary for the number 13. Thus, these five bits may specify bit 13. Similarly, "00000" is binary for 0 and "11111" is binary for 31. Thus, all 32 bits may be specified using a 5-bit specifier.

Register $6 may specify the bits of $5 used to fill the low-order bits of ACX/HI/LO as follows: bits 0–4 are used to specify the source of bit 0, bits 5–9 are used to specify bit 1, bits 10–14 are used to specify bit 2, bits 15–19 are used to specify bit 3, bits 20–24 are used to specify bit 4, and bits 25–29 are used to specify bit 5. The remaining bits, 30–31, may be unused. Thus, the instruction is performed using the specifiers as described to fill the lowest 6 bits of the LO register with the specified bits from the $5 register.

Finally, MULTP may be used to perform binary polynomial multiplication and MADDP may be used to perform binary polynomial multiplication with the result added to the ACX/HI/LO registers. These operations are analogous to MULT and MADD, but operate on binary polynomial operands.

The polynomial operands of MULTP and MADDP are encoded in 32-bit registers with each bit representing a polynomial coefficient. For example, the polynomial "$x^4+x+1$" would be encoded as "10011" because the coefficients of $x^3$ and $x^2$ are "0" and the remaining coefficients are "1". The MULTP instruction performs binary polynomial multiplication on two operands. For example, $$(x^4+x+1)(x+1)=x^5+x^4+x^2+2x+1.$$

Reducing the polynomial modulo two, yields $x^5+x^4+x^2+1$. If the polynomials are encoded in the binary representation above, the same multiplication may be expressed as (10011) (11)=110101.

The MADDP instruction performs multiplication just as MULTP, adding the result to the ACX/HI/LO registers. Polynomial addition may be performed using a bitwise XOR. For example, the binary polynomial addition $(x^4+x+1)+(x+1)$ yields $x^4+2x+2$. Reducing the coefficients modulo 2 yields $x^4$ which may be expressed as "10000".

Referring to FIGS. 2 and 3, MDU 2020 receives two 32-bit operands, RS and RT. Using these operands, MDU 2020 performs a requested operation and stores a result in registers ACX 2021, HI 2022, and LO 2023. Major data paths that may be used to perform these operations are shown in FIG. 3. The RShold register 3010 and the RThold register 3012 are used to hold the RS and RT operands. Multiplexers 3020, 3022, and 3024 are used to select whether to use the RS and RT operands directly or to use the values stored in the RShold register 3010 and the RThold register 3012. Additionally, multiplexer 3022 may be used to select between the low-order and high-order bits of RT or the value stored in the RThold register 3012.

The RThold register 3012 is connected to multiplexer 3022. Multiplexer 3022 produces a 16-bit result by selecting the high-order bits of RThold 3012, the low-order bits of RThold 3012, the high-order bits of the RT operand, or the low-order bits of the RT operand. The output from multiplexer 3022 is processed by Booth recoder 3040 and stored in register RTB 3042. Booth recoding is a technique that permits the multiplier array to treat signed and unsigned operands the same. The output of register RTB 3042 becomes the input SEL 3034 to array unit 3030.

Array unit 3030 is used to perform arithmetic and binary polynomial multiplication as described below with reference to FIG. 4. Array unit 3030 takes as inputs ACC1 3031, ACC2 3032, M 3033, SEL 3034, and RThold 3012. Inputs ACC1 3031 and ACC2 3032 are accumulated results used for operations that perform a multiplication and add or subtract the resulting value from an accumulated result. The inputs SEL 3034 (determined by register RTB 3042) and M 3033 (determined by register RShold 3010) form the operands for arithmetic operations. The inputs RThold 3012 (or the high-order or low-order bits of RThold 3012) and M 3033 (determined by RShold 3010) form operands for polynomial operations and permutations. Combinations of these inputs are used to perform various calculations as described in detail below.

Array unit 3030 also includes two outputs, ResultC 3035 and ResultS 3036. In performing arithmetic operations, carry-save adders (CSAs) may be used to build a multiplication array. Carry-save adders calculate sums and carries separately to produce two outputs. Thus, ResultC 3035 and ResultS 3036 represent, respectively, the carry and the sum outputs of a CSA multiplier array. In one implementation, ACC1 3031, ACC2 3032, ResultC 3035, and ResultS 3036 are each 72 bits long and the remaining inputs are at most 32 bits long. Inputs ACC1 3031 and ACC2 3032 may be selected using multiplexers 3037 and 3038.

Multiplexers 3050 and 3052 are used to select values as inputs to registers CPAA 3054 and CPAB 3056. For example, multiplexer 3050 may be used to select between ResultC 3035, the output of CPA 3058, or the output of multiplexer 3020 (i.e., operand RS or RShold 3010). Similarly, multiplexer 3052 may be used to select between ResultS 3036, the value 0, and the output of multiplexer 3024 (i.e., operand RT or the output of CPAA 3054 and CPAB 3056). These registers store the inputs to carry-propagate adder (CPA) 3058. CPA 3058 may be used to complete multiplication operations (multiplies) and to perform iterative division operations (divides) as discussed below.

Register RDM 3060 stores the result of CPA 3058. Finally, multiplexers 3070 and 3072 select which values form the result to be loaded into registers ACX, HI, and LO. Multiplexer 3070 may be used to select the ACX/HI/LO registers, RDM 3060, or the result of CPA 3058. Multiplexer 3072 may be used to instead load various permutations of the result selected by multipexer 3070. Multiplexer 3072 is used to perform various rotations and loads of the ACX/HI/LO registers by permitting selection of the following values (forming 72-bit values when concatenated): (1) ahl, the 72-bit output of multiplexer 3070; (2) arl, the 8 high-order bits of multiplexer 3070, the contents of RShold 3010, and the 32 low-order bits of multiplexer 3070; (3) ahr, the 40 high-order bits of multiplexer 3070 and the contents of RShold 3010; (4) hlr, the 40 low-order bits of multiplexer 3070 and the contents of RShold 3010; and (5) 0ah, the 40 high-order bits of multiplexer 3070 (with 32 leading zeros).

The HI/LO registers are used to store the results of multiplication and to provide support for accumulator operations. In one implementation, the precision of the HI/LO registers is increased by adding register ACX as an extended accumulator. Thus, the ACX/HI/LO registers may store a 72-bit value. The corresponding data paths shown in FIG. 3 and the accumulator capabilities of arrays 3030 also may be increased to support 72-bit values. Some operations cause the values stored in the result registers ACX, HI, and LO to be overwritten. For this reason, a separate result register 3080 may be provided to store the high-order and low-order result without the accumulator ACX.

Because the extended precision accumulator ACX/HI/LO may have higher precision than the general-purpose registers, it is not possible to load all 72 bits into a general-purpose register. Thus, it is desirable to provide instructions to support loading and manipulating the contents of the ACX/HI/LO registers (e.g., MFLHXU and MTLHX).

The data path described below includes six major parts: (1) input registering and selection; (2) Booth recoding; (3) multiplier arrays and permutation logic; (4) a carry propagate adder; (5) result registering and selection; and (6) a separate 32-bit output register for presenting results.

Input registering and selection is performed using the RShold and RThold registers to hold the RS and RT operands. Multiplexers select whether to use these operands directly or to use the registered versions. Booth recoding is performed on half of the RT operand at a time to provide inputs to the multiplier arrays and permutation logic.

Booth recoding is a technique that permits the multiplier array to treat signed and unsigned operands the same. This technique "recodes" operands as a subtraction from the next highest power of two. For example, 7 may be Booth recoded as follows: $8-1 = 1000_2 - 0001_2 = 100\bar{1}$, wherein $\bar{1}$ represents $-1$. Hennessy and Patterson describe Booth recoding in Appendix A of "Computer Architecture: A Quantitative Approach," Morgan Kaufmann Publishers, Inc. (1996), which is hereby incorporated by reference in its entirety for all purposes.

One array of array unit 3030 performs arithmetic multiplication and one array of array unit 3030 performs binary polynomial multiplication. In one implementation, both arrays are 32 bits by 16 bits (32×16) and are used once or twice depending on the size of the RT operand (i.e., an appropriate array is used once when RT is 16 bits long and twice when 32 bits long). The CPA may be used to complete multiplies and perform iterative divides. Other implementations may include faster mechanisms for performing divides.

The arithmetic multiplication array may be implemented using any of the techniques described by Hennessy and Patterson in the incorporated "Computer Architecture: A Quantitative Approach" Morgan Kaufmann Publishers, Inc. (1996). For example, Appendix A of Hennessy and Patterson describes several ways to speed up arithmetic multipliers. Any of the described techniques may be used as a basis for the polynomial multiplication extensions described below.

Figure 4:
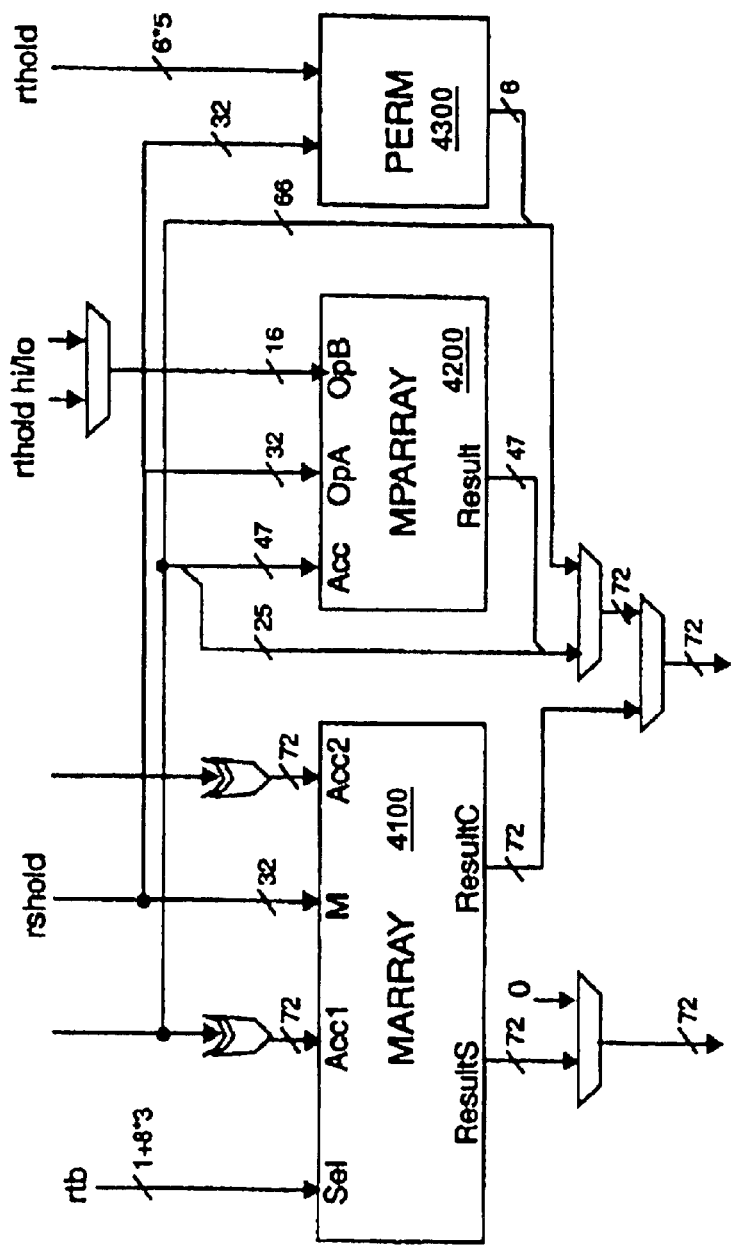
FIG. 4 is a block diagram of multiplier arrays supporting arithmetic and binary polynomial multiplication in one implementation.

Referring to FIG. 4, array unit 3030 includes two parallel multipliers (Marray 4100 and MParray 4200) and permutation logic 4300. The first array, Marray 4100, performs arithmetic multiplication as described below with reference to FIG. 5. Marray 4100 uses the following inputs as described above: ACC1 3031, ACC2 3032, M 3033, and SEL 3034. The outputs include ResultC 3035 and ResultS 3036. The second array, MParray 4200, performs binary polynomial multiplication as described below with reference to FIG. 6. MParray 4200 uses the following inputs as described above: the low-order bits of RThold 3012 or the high-order bits of RThold 3012; RShold 3010; and ACC1 3031. The output of MParray 4200 is ResultC 3036. Finally, permutation logic 4300 is used to perform various permutations on the low-order bits of RShold 3010 based on the value stored in RThold 3012.

Figure 5:
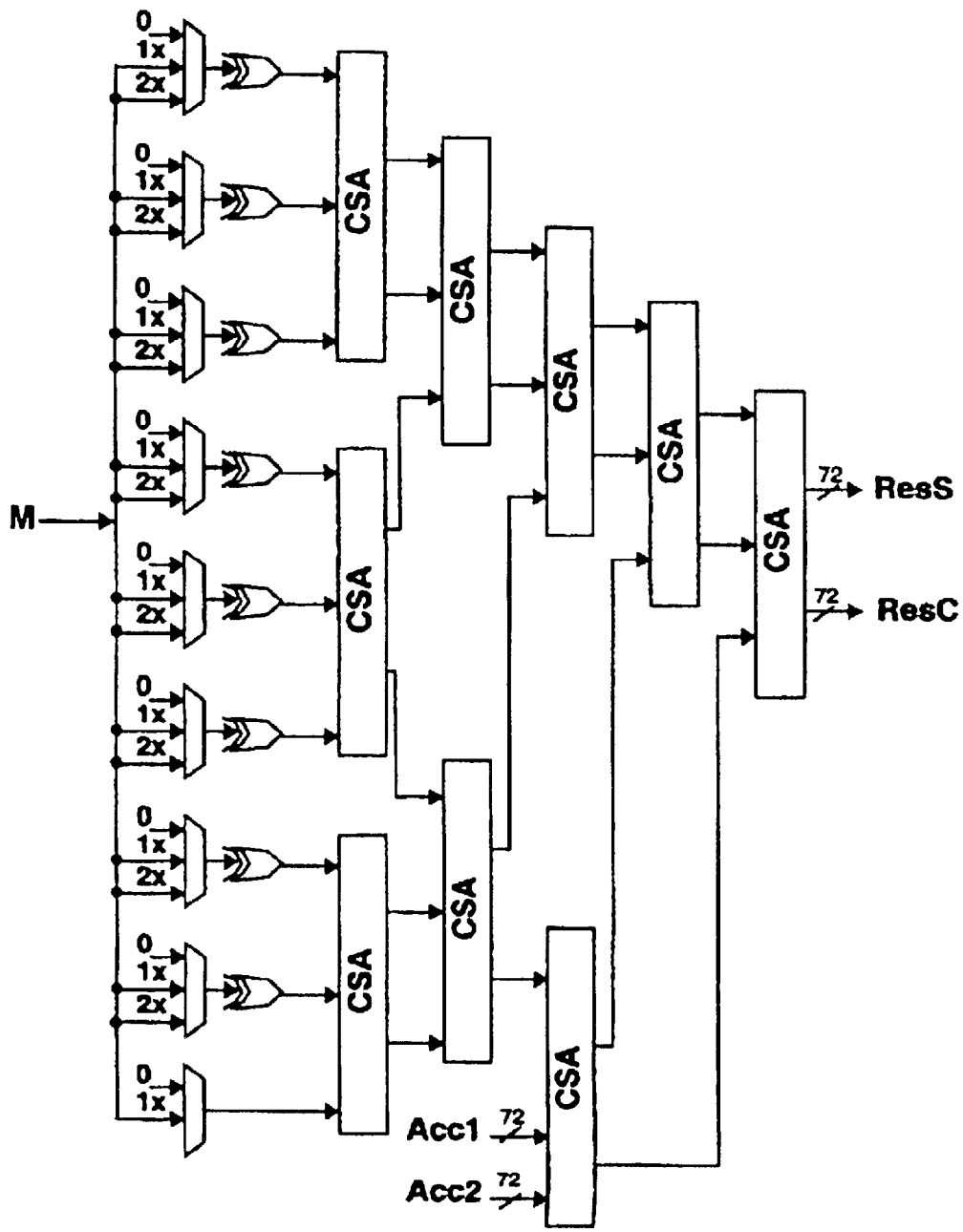
FIG. 5 is a block diagram of an arithmetic multiplier array that may be used in the implementation shown in FIG. 4.

Referring to FIG. 5, Marray 4100 is a 32-bit by 16-bit Wallace tree multiplier array that has been modified to support the addition of two 72-bit wide operands ACC1 and ACC2. The ACC1 and ACC2 operands hold a carry-save representation of a 72-bit value. Because additions are already performed to carryout multiplications (i.e., by the carry-select adders (CSAs)), an additional adder may be included to all ACC1 and ACC2 to be added to intermediate results of multiplications. Marray 4100 generates a 72-bit wide result in a carry-save representation. Since 32×16 bits are processed per cycle, two passes through the array are required for 32×32 bit multiplies.

Marray 4100 is implemented as a Wallace tree built from arrays of carry-save adders. The width of these arrays may vary. This design may be implemented using an automated place and route rather than using data path style. Because the accumulate value from the previous array pass is input late into the array, the accumulate value does not need to come directly from a register. Booth recoding is performed using the method of overlapping triplets to more efficiently process multiplications. The output of Booth recoding tells whether to add operand M multiplied by −2, −1, 0, 1, or 2 for each power of 4. The multiplexers on the top-level CSA inputs are used to select the corresponding multiple of M.

Marray 4100 accumulates eight products from the Booth recoding plus one special partial product. The latter may be used for 32-bit unsigned calculations using the "0" and "1×" choices from the multiplexers. Within the Wallace tree, operands may be sign-extended to properly accumulate 2's complement results.

Figure 6:
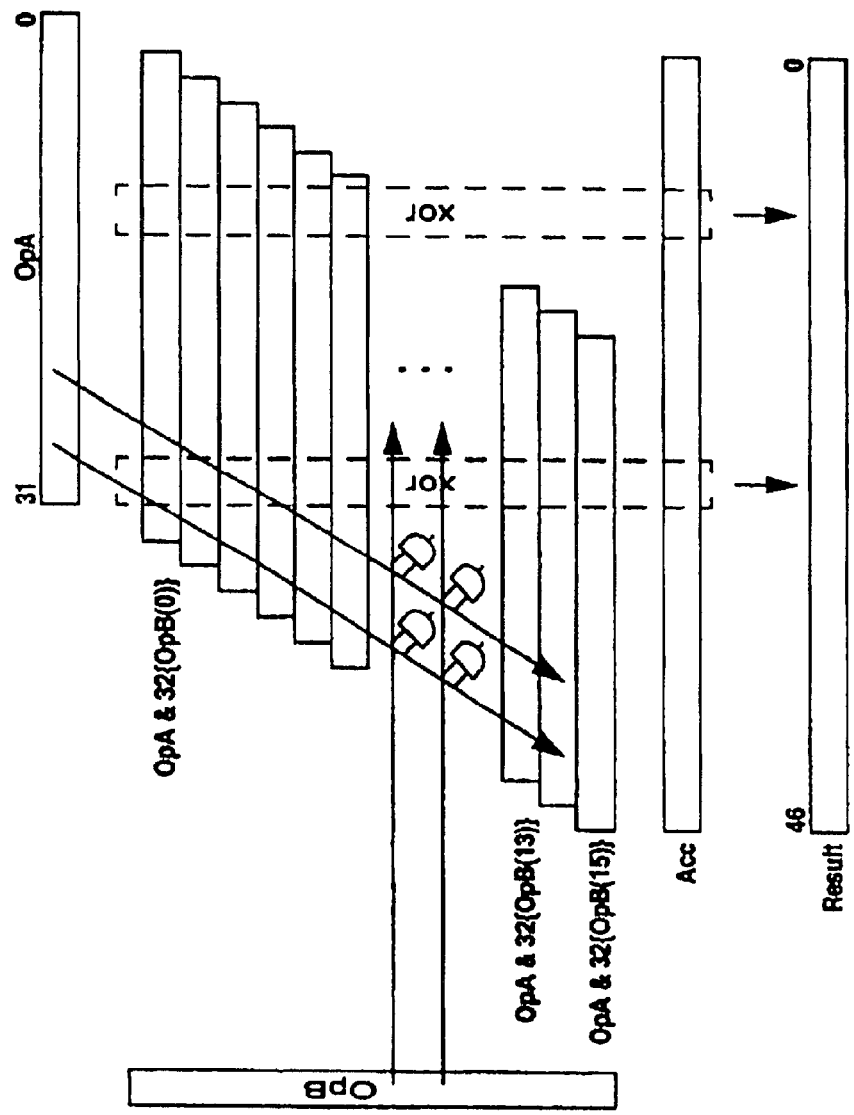
FIG. 6 is a block diagram of a binary polynomial multiplier array that may be used in the implementation shown in FIG. 4.

Referring to FIG. 6, binary polynomial-based multiplication operations are processed similarly to corresponding unsigned arithmetic operations. In one implementation, MParray 4200 is a 32×16 bit array that also performs an addition using exclusive-or (XOR) on an operand, for example, ACC1. As with Marray 4100, 32×16 bits are processed per cycle and two passes through the array may be used for 32×32 multiplies. In the first cycle, ACC1 is zero (for a MULTP operation) or the previous result (for a MADDP operation). In a second cycle, ACC1 is the high order bits of the output from the first cycle.

MParray 4200 multiplies two operands (e.g., OpA and OpB) using an array with each row formed by taking the AND of OpA and a bit of OpB. For example, the first row is the logical AND of OpA and bit 0 of OpB. Row two is the logical AND of OpA and bit 1 of OpB. The result of each successive row is shifted one bit to the left. The final result is formed by taking the exclusive-or (XOR) of each column. Because a bitwise XOR may be used to perform addition in binary polynomial arithmetic, an accumulator row may be added to array MParray 4200 to support instructions such as MADDP.

Three multiplexers shown in FIG. 4 are used to select either zero or the sum output of Marray 4100 to form ResultS 3036; and the output of Marray 4100, MParray 4200, or permutation logic 4300 to form ResultC 3035.

Referring again to FIG. 1, MDU 2020 starts a computation in the first cycle of the execute stage of the pipeline 1003. If the calculations complete before the instruction has moved past the memory stage 1004 in the pipeline, then the result is held at that point. If the operation completes when the instruction has been moved past the memory stage 1004 in the pipeline, then the instruction has been committed and the results are written directly to the ACX/HI/LO registers.

The MDU 2020 is decoupled from the environment pipeline; it does not stall with the environment. That is to say the MDU 2020 will continue its computation during pipeline stalls. In this way, multi-cycle MDU operations may be partially masked by system stalls and/or other, non-MDU instructions.

Figure 7A:
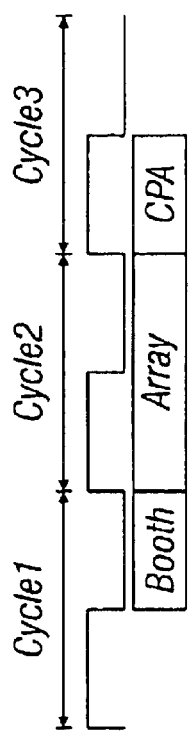
FIG. 7A is a timing diagram showing the operation of 32-bit by 16-bit multiplies in one implementation.

FIG. 7A shows the pipeline flow through MDU 2020 for 32×16 bit multiplies. RS and RT arrive late, so the first cycle may be used for Booth recoding. The second cycle is where the array is run and the third cycle is where the CPA 3058 completes the computation. Because the results are always accessible to reads by MFxx instructions, 32×16 multiplies may be run without stalls. A 32×16 MUL, which returns the result directly to a general-purpose register (GPR) may stall for one cycle.

Figure 7B:
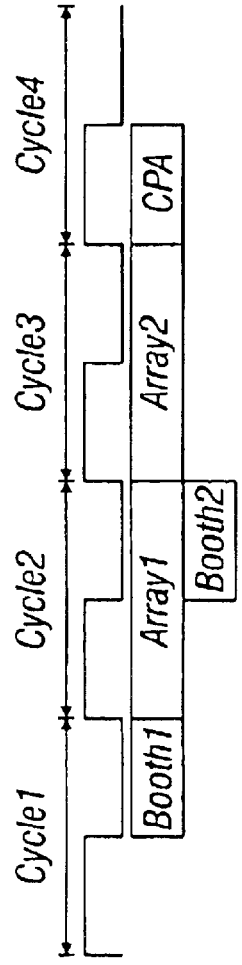
FIG. 7B is a timing diagram showing the operation of 32-bit by 32-bit multiplies in one implementation.

Referring to FIG. 7B, for 32×32 bit multiplies, the array is used twice, which adds one extra clock cycle to the 32×16 bit multiplications. As the first array pass is completing for the first portion of operand RT, Booth recoding is performed on the second portion of the operand. Thus, the Booth recoded portion of RT is available to begin the second pass through the array immediately after the first pass is complete. The multiplication result is then calculated using CPA 3058.

Figure 7C:
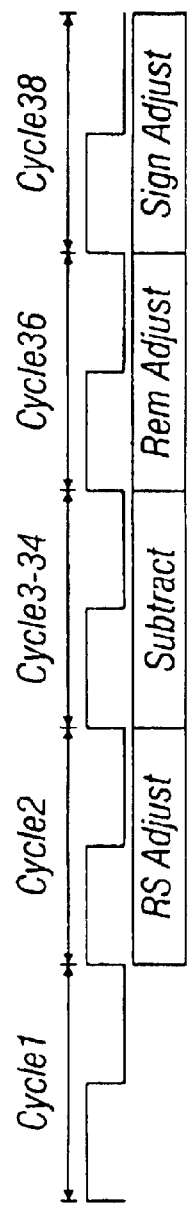
FIG. 7C is a timing diagram showing the operation of divisions in one implementation.

Referring to FIG. 7C, a simple non-restoring division algorithm may be used for positive operands. The first cycle is used to negate RS, if needed. For timing reasons, this cycle is taken even if RS is positive. Following that, 32, 25, 18, or 10 cycles of iterative add/subtract operations are performed. The actual number is based on the amount of leading zeros on the positive RS operand. A final remainder adjust may be needed if the remainder was negative. For timing reasons, this cycle is taken even if the remainder adjust is not needed. Finally, sign adjustment is performed if needed on the quotient and/or remainder. If both operands are positive, this cycle may be skipped.

In one implementation, target applications demand fast division. Many techniques may be used to increase the performance of division. For example, the Sweeney, Robertson, and Tocher (SRT) algorithm or some variation thereof may be used.

Figure 8:
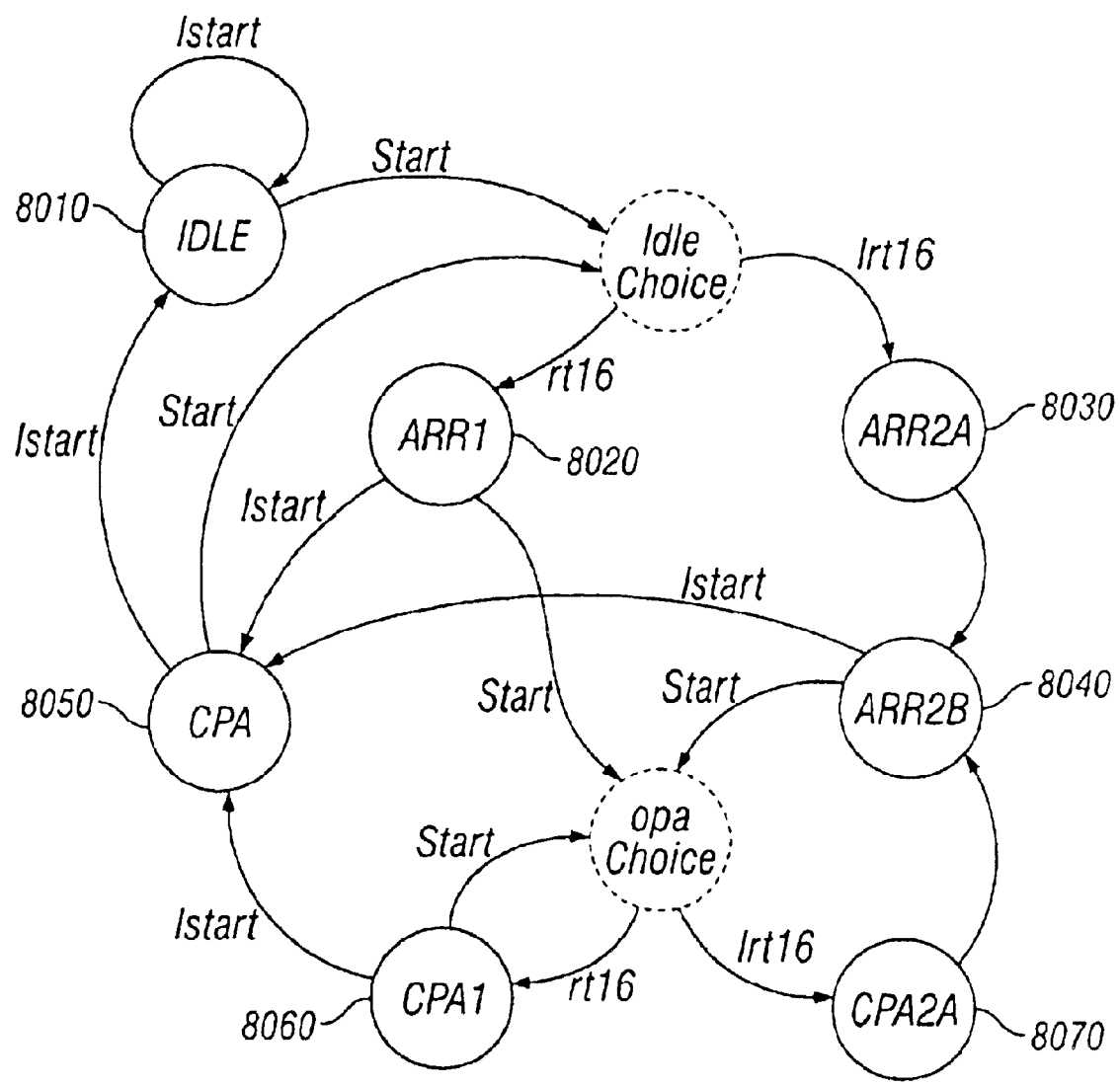
FIG. 8 is finite state machine implementing steps for performing multiply instructions.

Referring to FIG. 8, multiplication operations are implemented using a finite state machine. Multiplication begins in IDLE state 8010. The multiplier stays in the idle state until the start signal is asserted. The multiplier then transitions to either the ARR1 state 8020 or the ARR2A state 8030 depending on whether operand RT contains a 32-bit or 16-bit value. If a 16-bit value is stored in RT, then the system transitions to state ARR2A 8030 where the first array pass is run. Then, the multiplier transitions to state ARR2B 8040 where the second array pass is run. If a 16-bit value is stored in operand RT, the multiplication is run through the array unit in state ARR1 8020.

In this implementation, the multiplier is pipelined. One multiplication may be run through the array unit and another through the CPA. Thus, the multiplier either transitions from ARR1 8020 or ARR2B 8040 to state CPA 8050 if there is no additional multiplication to perform, or begins a second multiplication. If no additional multiplication is needed, the multiplier is run through CPA 8050 and then either returns to IDLE 8010 or begins a new multiplication as discussed above.

If a second multiplication is ready to be performed when the first multiplication is ready to be run through the CPA, then the multiplier either transitions to CPA1 8060 (for a 32×16 multiplication) or CPA2A 8070 (for a 32×32 multiplication). In state CPA1 8060, the first multiplication is run through the CPA and the second multiplication is run through the array unit. The multiplier then transitions to state CPA 8050 to finalize the second multiplication.

If the second multiplication is a 32-bit multiplication, then in state CPA2A 8070 the first multiplication is run through the CPA and the second multiplication is run through the array unit. The multiplier then transitions to state ARR2B 8040 to complete the 32×32 multiplication. This pipelined approach allows 32×16 multiplications to be issued every clock cycle, with a two-cycle latency. Also, 32×32 multiplications may be issued every other clock cycle, with a three-cycle latency.

Figure 9:
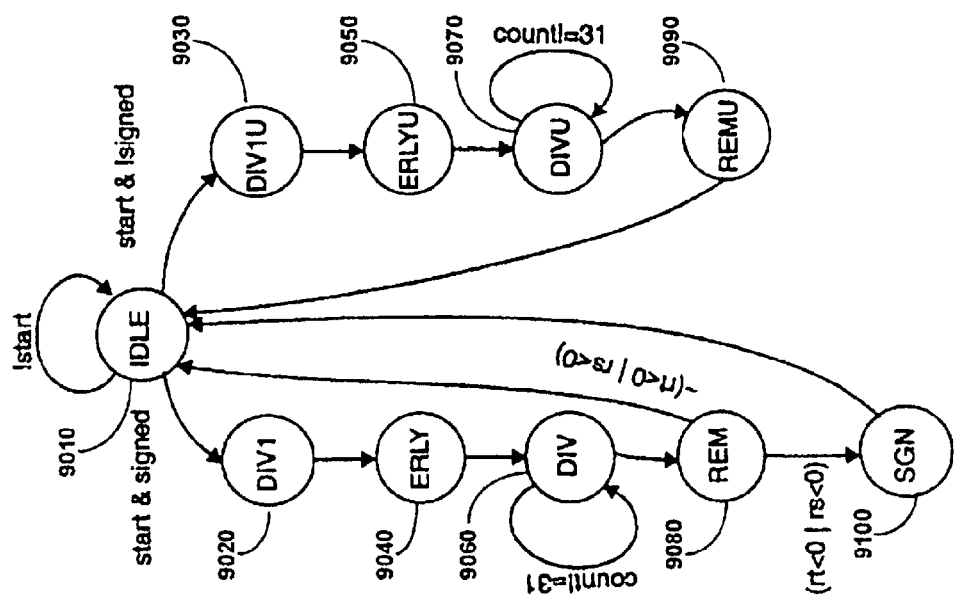
FIG. 9 is a finite state machine implementing steps for performing division instructions.

Referring to FIG. 9, iterative division operations may be implemented using a finite state machine. In one implementation, the MDU begins in IDLE state 9010. When a signal is received to begin a division operation, the MDU either transitions to DIV1 9020 if the operation is signed or DIV1U 9030 if the operation is unsigned. States DIV1 9020 and ERLY 9040 are used to prepare signed operands for division, adjusting the signs as necessary. States DIV1U 9030 and ERLYU 9050 are used to prepare an unsigned division operation. In states ERLY 9040 and ERLYU 9050, leading zeros are detected in operand RS to adjust the number of division iterations necessary.

Iterative division is performed in states DIV 9060 and DIVU 9070. Division may be performed by using a series of iterative add/subtracts and shifts. Finally, the remainders are finalized in states REM 9080 and REMU 9090. If either of the operands is negative, sign adjustment is performed in state SGN 9100.

Referring again to FIG. 4, in one implementation, permutation logic 4300 is used to support the PPERM instruction described above. Permutation logic 4300 consists of 6 single bit 32:1 selectors that may be used to select any of the 32 bits of RShold 3010 based on the value of RThold 3012. This logic may be implemented directly in the data path module.

For example, permutation logic 4300 may be used to execute the instruction "PPERM $5, $6". Permutation logic 4300 uses 6 5-bit selectors determined by RThold 3012 to identify which bits to include as output from RShold 3010. For example, if register $5 contains the low-order bits "010101", then the selector "00010" would choose bit 2 (i.e., the third bit from the right) containing "1". If RThold 3012 contains the low-order bits "0001000011", then bit 2 (containing a "1") and bit 3 (containing a "0") will be selected yielding "10". Using this method, permutation logic 4300 may select bits from RShold 3010 to generate 6 bits based on RThold 3012. The resulting 6 bits concatenated to the 66 low-order bits of ACC1 to form the result. This effectively shifts the 66 low-order bits of ACC1 six bits to the left and replaces the 6 low-order bits with the output of the permutation logic 4300.

In addition to multiplier implementations using hardware (e.g., within a microprocessor or microcontroller), implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claims.

What is claimed is:

1. A multiply unit for use in a microprocessor, the microprocessor having at least one general-purpose register for storing a predetermined number of bits, the multiply unit comprising:
    at least one input data path for receiving one or more input operands by the multiply unit;
    a multiplier connected to receive the one or more input operands and to perform multiplication using the one or more input operands;
    an extended-precision accumulated output data path connected to receive an output of the multiplier and including more bits than the sum of the lengths of the one or more input operands; and
    an extended-precision accumulator including an extended register, a high-order register, and a low-order register, wherein data from the extended-precision accumulated output path is stored in the extended-precision accumulator.

2. The multiply unit of claim 1 wherein the multiplier provides a multiply-add operation whereby at least two operands are multiplied and added to the contents of the extended-precision accumulator.

3. The multiply unit of claim 1 wherein the multiplier includes:
    an arithmetic multiplier; and
    a polynomial multiplier.

4. The multiply unit of claim 3 wherein the arithmetic multiplier is a twos-complement binary arithmetic multiplier and the polynomial multiplier is a polynomial basis arithmetic multiplier.

5. The multiply unit of claim 3 wherein the polynomial multiplier provides a multiply-add operation whereby at least two operands are polynomial-basis multiplied and added to the contents of the extended-precision accumulator.

6. The multiply unit of claim 1 wherein the multiplier includes result logic for selecting which values to load into the extended-precision accumulator.

7. The multiply unit of claim 6 wherein the result logic is a multiplexer.

8. The multiply unit of claim 1 wherein the extended register, the high-order register, and the low-order register each include at least one general-purpose register.

9. The multiply unit of claim 1 wherein the extended register stores 8-bit values, the high-order register stores 32-bit values, and the low-order register stores 32-bit values.

10. The multiply unit of claim 1 wherein the microprocessor includes at least one instruction for manipulating the contents of the extended-precision accumulator.

11. The multiply unit of claim 10 wherein the at least one instruction includes an instruction that moves a value from the extended-precision accumulator into a general-purpose register.

12. The multiply unit of claim 11 wherein the instruction further includes shifting the contents of the extended-precision accumulator.

13. The multiply unit of claim 12 the contents of the extended-precision accumulator are shifted rightward by the size of the value moved to the general-purpose register from the extended-precision accumulator.

14. The multiply unit of claim 10 wherein the at least one instruction includes an instruction that moves a value to the extended-precision accumulator from a general-purpose register.

15. The multiply unit of claim 14 wherein the instruction further includes shifting the contents of the extended-precision accumulator.

16. The multiply unit of claim 15 wherein the contents of the extended-precision accumulator are shifted leftward by the size of the value moved from the general-purpose register to the extended-precision accumulator.

17. In a microprocessor core having at least one general-purpose register, a method for performing arithmetic operations, the method comprising:
fetching an instruction to perform an operation from a data store;
reading one or more registers;
performing the operation using a multiply unit, the multiply unit comprising:
at least one input register for receiving one or more input operands by the multiply unit;
a multiplier connected to receive the one or more input operands and to perform multiplication using the one or more input operands;
an extended-precision accumulated output data path connected to receive an output of the multiplier and including more bits than the sum of the lengths of the one or more input operands; and
an extended-precision accumulator including an extended register, a high-order register, and a low-order register, the extended precision accumulator storing data from the extended-precision accumulated output path.

18. The method of claim 17 further comprising using the multiplier to perform a multiply-add operation by multiplying at least two operands and adding the results of the multiplication to the contents of the extended-precision accumulator.

19. The method of claim 17 wherein the multiplier includes:
an arithmetic multiplier; and
a polynomial multiplier.

20. The method of claim 19 wherein the arithmetic multiplier is a twos-complement binary arithmetic multiplier and the polynomial multiplier is a polynomial basis arithmetic multiplier.

21. The method of claim 19 further comprising using the polynomial multiplier to perform a multiply-add operation by multiplying at least two operands and adding the results of the multiplication to the contents of the extended-precision accumulator.

22. The method of claim 17 wherein the multiplier includes result logic for selecting which values to load into the extended-precision accumulator.

23. The method of claim 22 wherein the result logic is a multiplexer.

24. The method of claim 17 wherein the extended register, the high-order register, and the low-order register each include at least one general-purpose register.

25. The method of claim 17 wherein the extended register stores 8-bit values, the high-order register stores 32-bit values, and the low-order register stores 32-bit values.

26. The method of claim 17 further comprising manipulating the contents of the extended-precision accumulator.

27. The method of claim 26 wherein manipulating the contents comprises moving a value from the extended-precision accumulator into a general-purpose register.

28. The method of claim 27 wherein manipulating the contents further includes shifting the contents of the extended-precision accumulator.

29. The method of claim 28 wherein shifting the contents includes shifting the contents of the extended-precision accumulator rightward by the size of the value moved to the general-purpose register from the extended-precision accumulator.

30. The method of claim 26 wherein manipulating the contents includes moving a value to the extended-precision accumulator from a general-purpose register.

31. The method of claim 30 wherein manipulating the contents further includes shifting the contents of the extended-precision accumulator.

32. The method of claim 31 wherein shifting the contents includes shifting the contents of the extended-precision accumulator leftward by the size of the value moved from the general-purpose register to the extended-precision accumulator.

33. A computer-readable medium comprising a microprocessor core embodied in software, the microprocessor core including at least one general-purpose register and a multiply unit, the multiply unit comprising:
at least one input data path for receiving one or more input operands by the multiply unit;
a multiplier connected to receive the one or more input operands and to perform multiplication using the one or more input operands;
an extended-precision accumulated output data path connected to receive an output of the multiplier and including more bits than the sum of the lengths of the one or more input operands; and
an extended-precision accumulator wherein data from the extended-precision accumulated output path is stored in the extended-precision accumulator and the microprocessor core includes an instruction that moves a value from the extended-precision accumulator into a general-purpose register.

34. The computer-readable medium of claim 33 wherein the multiplier provides a multiply-add operation whereby at least two operands are multiplied and added to the contents of the extended-precision accumulator.

35. The computer-readable medium of claim 33 wherein the multiplier includes:
an arithmetic multiplier; and
a polynomial multiplier.

36. The computer-readable medium of claim 35 wherein the arithmetic multiplier is a twos-complement binary arithmetic multiplier and the polynomial multiplier is a polynomial basis arithmetic multiplier.

37. The computer-readable medium of claim 35 wherein the polynomial multiplier provides a multiply-add operation whereby at least two operands are polynomial-basis multiplied and added to the contents of the extended-precision accumulator.

38. The computer-readable medium of claim 33 wherein the multiplier includes result logic for selecting which values to load into the extended-precision accumulator.

39. The computer-readable medium of claim 38 wherein the result logic is a multiplexer.

40. The computer-readable medium of claim 33 wherein the extended-precision accumulator includes:

an extended register;

a high-order register; and a low-order register.

41. The computer-readable medium of claim 40 wherein the extended register, the high-order register, and the low-order register each include at least one general-purpose register.

42. The computer-readable medium of medium of claim 40 wherein the extended register stores 8-bit values, the high-order register stores 32-bit values, and the low-order register stores 32-bit values.

43. The computer-readable medium of claim 33 wherein the microprocessor core includes at least one instruction for manipulating the contents of the extended-precision accumulator.

44. The computer-readable medium of claim 33 wherein the instruction further includes shifting the contents of the extended-precision accumulator.

45. The computer-readable medium of claim 44 wherein the contents of the extended-precision accumulator are shifted rightward by the size of the value moved to the general-purpose register from the extended-precision accumulator.

46. The computer-readable medium of claim 43 wherein the at least one instruction includes an instruction that moves a value to the extended-precision accumulator from a general-purpose register.

47. The computer-readable medium of claim 46 wherein the instruction further includes shifting the contents of the extended-precision accumulator.

48. The computer-readable medium of claim 47 wherein the contents of the extended-precision accumulator are shifted leftward by the size of the value moved from the general-purpose register to the extended-precision accumulator.

* * * * *

UNITED STATES PATENT AND TRADEMARK OFFICE
CERTIFICATE OF CORRECTION

PATENT NO. : 7,181,484 B2  Page 1 of 1
APPLICATION NO. : 09/788685
DATED : February 20, 2007
INVENTOR(S) : Stribaek et al.

It is certified that error appears in the above-identified patent and that said Letters Patent is hereby corrected as shown below:

Title Page
In section (56), under "OTHER PUBLICATIONS", insert --INTERSIL Data Sheet, "HS-RTX2010RH: Radiation Hardened Real Time Express Microcontroller," [online] March 2000, [Retrieved on February 16, 2006] Retrieved from the Internet:<URL: http://www.intersil.com/data/fn/fn3961.pdf> (36 pages).--.

Signed and Sealed this

Eighteenth Day of December, 2007

JON W. DUDAS
*Director of the United States Patent and Trademark Office*